United States Patent [19]

Fournier

[11] 4,044,356

[45] Aug. 23, 1977

[54] PROCESS AND DEVICE FOR CORRELATION FOR USE IN A DOPPLER RADAR INSTALLATION

[75] Inventor: Jacques Fournier, Chatillon sur Bagneux, France

[73] Assignee: Societe Nationale d'Etude et de Construction de Moteurs d'Aviation, Paris, France

[21] Appl. No.: 615,686

[22] Filed: Sept. 22, 1975

[30] Foreign Application Priority Data

Sept. 27, 1974 France .................. 74.33248

[51] Int. Cl.² .................. G01S 9/02; G01S 7/28
[52] U.S. Cl. .................. 343/17.2 R; 340/15.5 SC
[58] Field of Search .................. 343/14, 13, 17.2 R, 343/100 CL; 340/15.5 TA, 15.5 SC

[56] References Cited

U.S. PATENT DOCUMENTS

| 3,577,144 | 5/1971 | Girault | 343/14 |
| 3,889,261 | 6/1975 | Sirven | 343/14 |
| 3,906,213 | 9/1975 | Meriauk et al. | 343/100 CL |

FOREIGN PATENT DOCUMENTS

| 1,572,953 | 4/1969 | France |
| 2,234,707 | 4/1974 | Germany |
| 1,380,451 | 1/1975 | United Kingdom |
| 1,222,242 | 2/1971 | United Kingdom |

*Primary Examiner*—Nelson Moskowitz
*Attorney, Agent, or Firm*—Watson, Cole, Grindle & Watson

[57] ABSTRACT

In a double correlation device incorporated in a radar installation for measuring distance, the transmitted high-frequency signal is modulated, by frequency displacement, by a series of pseudo-random pulses. The first correlation is carried out between each pulse of the series and a delayed version of the series, the delay being chosen to correspond to the distance zone to be swept. The resulting signal undergoes a second correlation with the signal received after reflection from the target and controls a switch in order to deduce information on the distance investigated.

3 Claims, 6 Drawing Figures

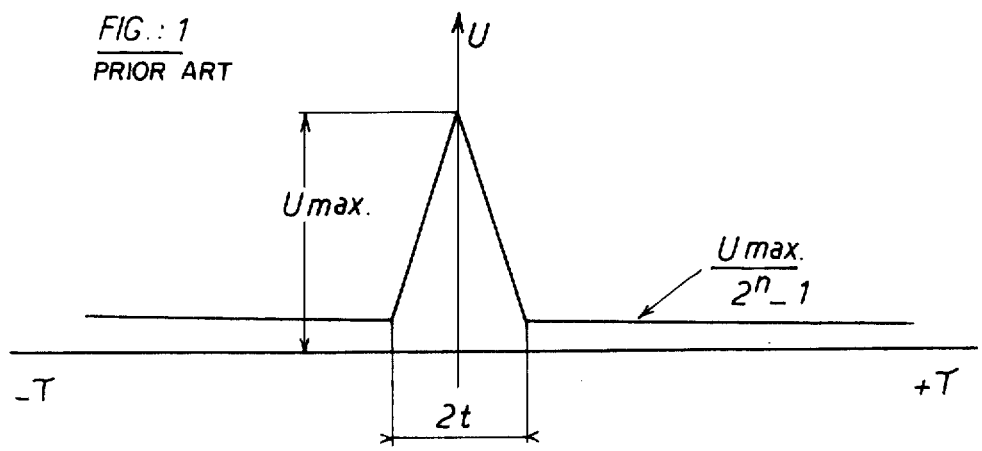
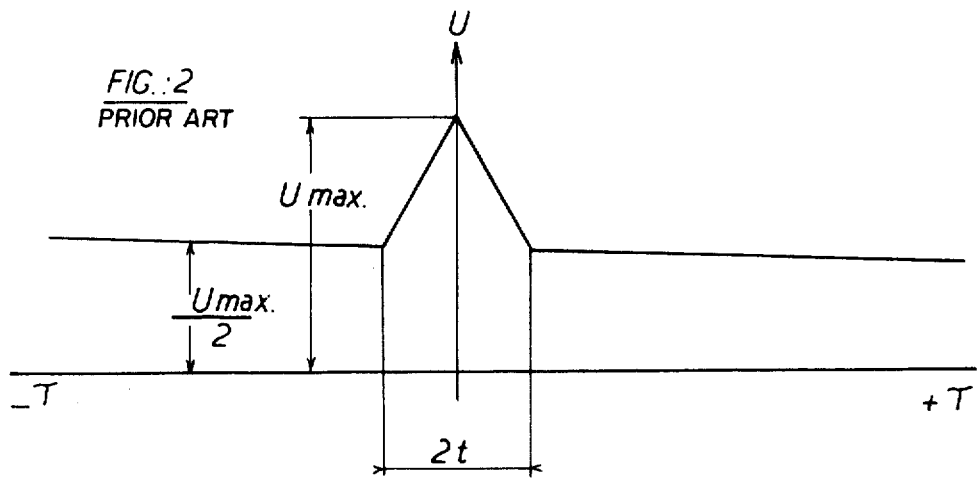

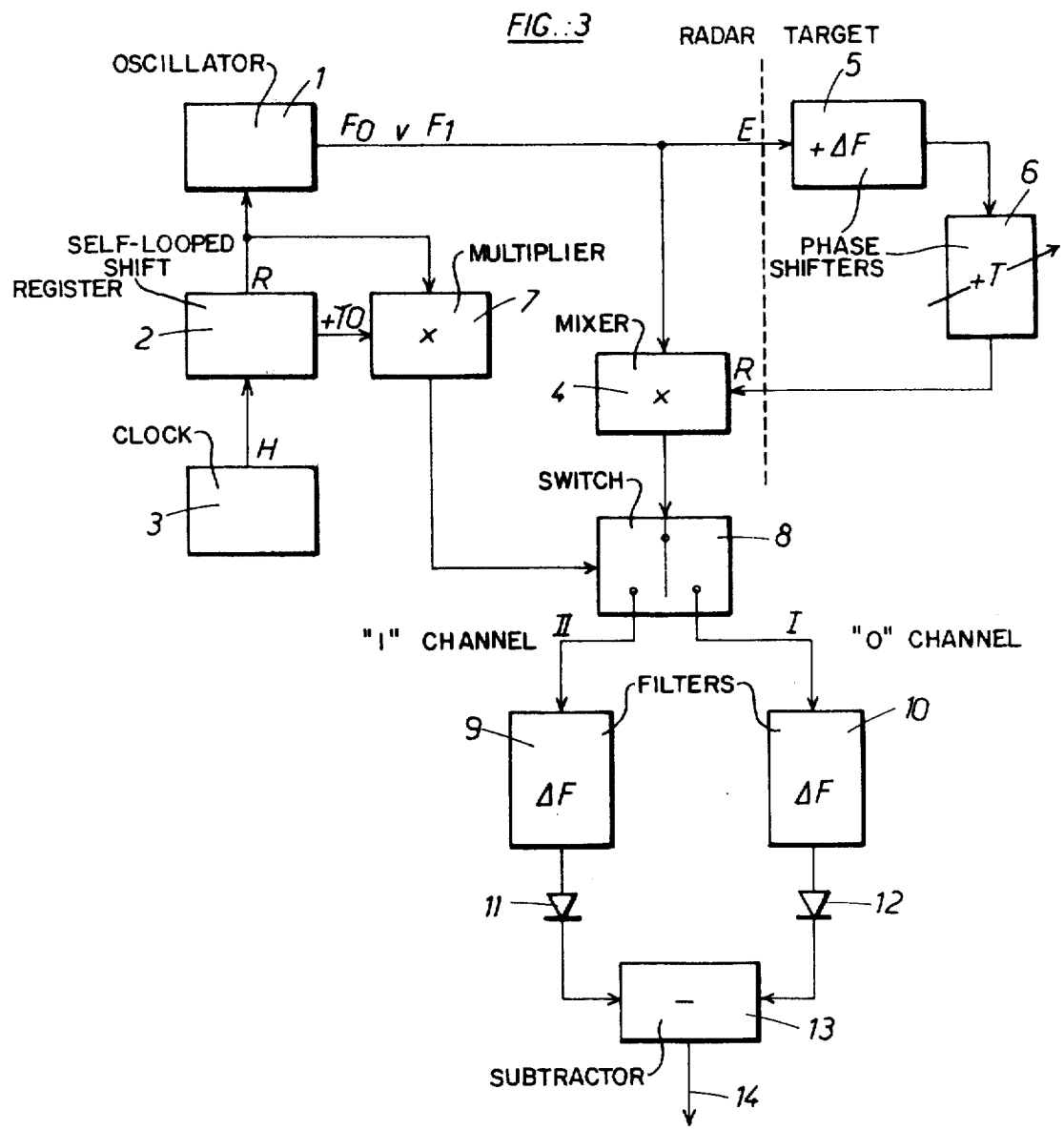

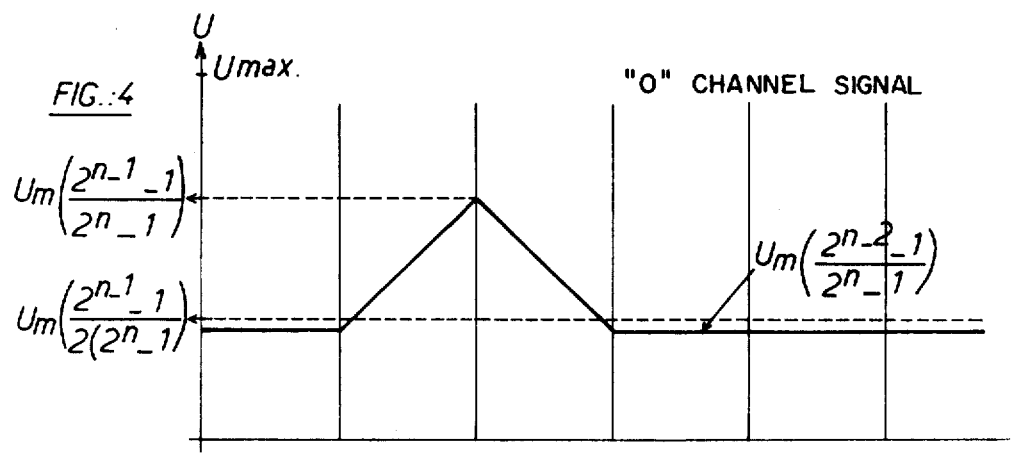
FIG.:4
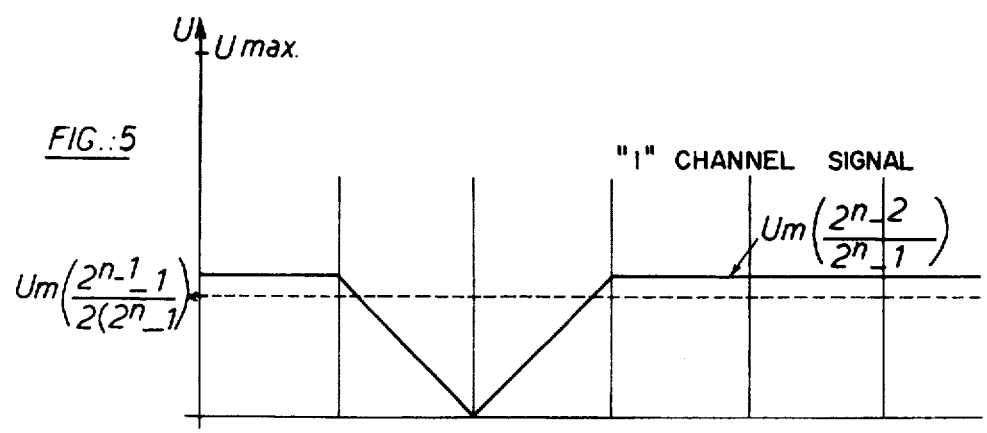
FIG.:5
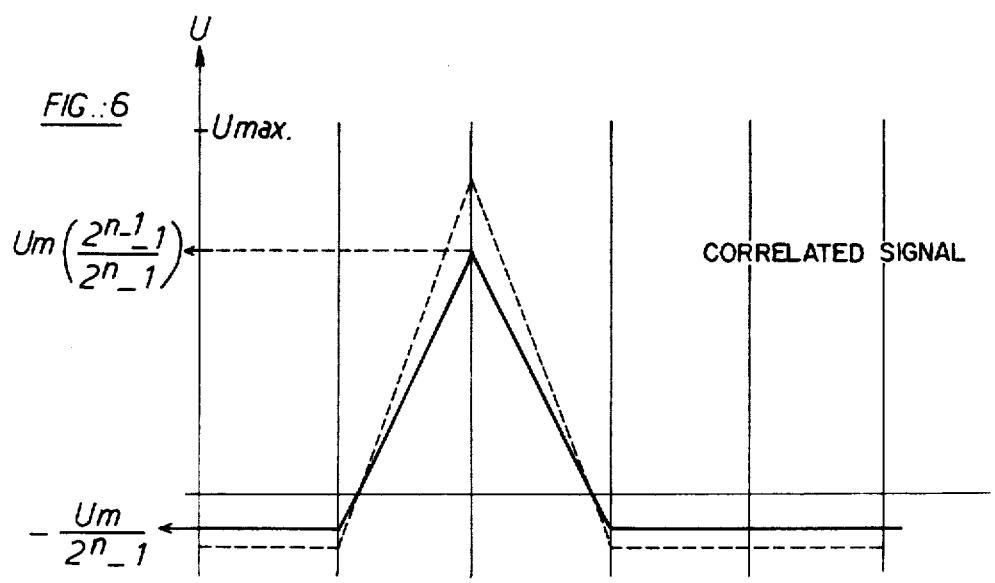
FIG.:6

PROCESS AND DEVICE FOR CORRELATION FOR USE IN A DOPPLER RADAR INSTALLATION

The present invention relates to a radar installation and more specifically to a correlation process and to a correlation device which can be used in a telemetry radar installation employing the Doppler effect.

French Specification No. 1,572,953 relates to a Doppler radar installation in which for purposes of localisation, a random signal is used in a correlator, in order to be able to compare each transmitted signal and the corresponding signal received by reflection from the target, in such a way as to deduce therefrom the location of the target. The transmitted and received signals are applied to the inputs of the correlator, after the transmitted signal has been artificially subjected to a delay, related to a chosen distance zone in which a target is to be detected.

The correlation of the two signals which takes place in the said correlator is an operation known to those skilled in the art and consists of multiplication of one of the signals by the other, followed by filtering or integration of the resulting product, that is to say that the correlator is formed as a series of branches each of which comprises a multiplier and a filter. The apparent complication which is introduced by utilization of the random signals in fact permits one to improve the signal-to-noise ratio, which is valuable in the case of interference.

The invention rests on a principle connected with that set out in the above-mentioned specification, in that a correlator carries out a correlation between the transmitted radar signal and the received radar signal, and that a constant delay which is related to a given distance zone in which a target is to be detected, is introduced during correlation. However, the invention forms an improvement in relation to the installation described in the said specification, because it permits a simplification of the technology required for implementation.

According to one aspect of the invention, there is provided a correlation process for use in a Doppler radar installation having a transmitting part and a receiving part in the same station, a measure of distance being obtained by comparison of the signal received with a delayed version of the transmitted signal in which a cyclic series of pseudo-random pulses frequency modulates the high-frequency radar signal before it is transmitted by the transmitting part, a first correlation is performed between each pulse of the said cyclic series and a delayed pulse from said series, the delay being chosen to correspond to the distance zone to be swept by the radar installation, and the signal derived from the first correlation is directly electrically connected to the said receiving part for subsequent control switching of a second correlation between the transmitted radar signal and the radar signal received by reflection from a target, in order to deduce information concerning the distance investigated.

According to another aspect of the invention, there is provided a correlation device incorporated in a Doppler radar installation for implementing a process as described above, in which a measure of distance is obtained by comparison of the signal received with a delayed reply of the transmitted signal, said correlation device comprising an oscillator capable of emitting radar signals on two different frequencies, pulse generating means suitable for forming a series of pseudo-random digital pulses, control means for controlling the oscillator in response to said pulse generating means so that a radar signal of one or other of said two frequencies is transmitted in dependence on each pulse of the said series, a first multiplier having its inputs connected to receive the said pulse series and a version of said pulse series which is subjected to a constant delay chosen to correspond to the distance zone to be swept by the radar installation, a second multiplier having its inputs connected to receive the transmitted radar signal and the radar signal received by reflection from a target, and switching means, controlled by the two multipliers, to connect the received signals to one or other of two filters, so as to effect double correlation and finally to supply information concerning the location investigated.

It should be noted that a cyclically repeating series of pulses is used as the series of random binary pulses, that is to say, a series of digital values or binary bits ("zero" and "one") which controls the operation of the radar installation in order to localise the target to be investigated with effectiveness and precision, this series being advantageously produced in a shift register connected in a closed loop, as known per se.

The invention will be better understood with reference to the accompanying drawings, in which:

FIG. 1 is a graph showing the autocorrelation function of a sequence of maximum length produced by a conventional self-looped shift register, FIG. 2 is a similar graph showing the autocorrelation function of a high frequency signal modulated in binary phase between two frequency values by a sequence of the same type, FIG. 3 is a block schematic diagram of a device according to the invention, FIGS. 4 and 5 are graphs showing the signals available on the two output channels of the device shown in FIG. 3, and FIG. 6 is a graph showing the resulting correlation function.

It is known in the art that a shift register formed from $n$ stages, which is connected in a closed loop, can be used, to produce a sequence of $2^n - 1$ bits which repeats endlessly unless this operation is stopped. Such a sequence, hereinafter referred to as a sequence of maximum length can be used as a series of pseudo-random digital pulses. The number or bits forming this sequence is uneven, the quantity of 0 states being one less than the quantity of 1 states. The autocorrelation function of a sequence of maximum length is shown in FIG. 1. The delay $\tau$ introduced during correlation has been shown on the abscissa and the resulting voltage on the ordinate. This autocorrelation function has the form of an isosceles triangle, of which the length of the base is equal to $2t$, $t$ being the duration of a bit, superimposed on an almost horizontal pedestal which has a value equal to the energy contained in a bit, having the value $U_{max}/2^n - 1$.

The autocorrelation function of a high frequency signal, having a single nominal frequency F and being subject to binary phase modulation between phases 0 and $\pi$ by a sequence of the above type, would be of the type shown in FIG. 1. However, if the frequency shifting is impressed on to a carrier wave in such a way that the bits of the above sequence produce, according to their state 0 or 1, frequencies having discrete values $F_0$ and $F_1$ respectively, the autocorrelation function has the form shown in FIG. 1. The width of the base of the triangle is the same as previously, but the pedestal has a value which tends towards $1/2U_{max}$.

This poor peak-to-pedestal ratio (ratio $1/2U_{max}$ to $U_{max}$) renders such an arrangement practically unexploitable in a radar system. This is the reason why means such as those of the invention have been devised for improving the peak-to-pedestal ratio while retaining the advantages of binary frequency modulation.

FIG. 3 is a block schematic diagram of radar apparatus incorporating a device according to the invention. The output frequency of an oscillator 1 can be modulated by shifting between two states by the application of a control voltage by known means, for example, by using a varactor. This control voltage comprises pulse signals derived from a shift register 2 connected in a closed loop and operated by a clock 3, the connection of the shift register 2 being such that it is adapted to supply a sequence of maximum length, the actual length being dependent on the number of stages forming the register. Thus, the oscillator 1 supplies a frequency $F_0$ corresponding to 0 state of the sequence and a frequency $F_1$ corresponding to its 1 state. The difference $F_0 - F_1$ is made sufficiently large that it is easily possible to separate the beat frequency equal to the difference between these two frequencies from the frequency Doppler variation $\Delta F$.

The signal of frequency $F_0$ or $F_1$ is transmitted at E by the radar apparatus, reflected by the target and received at R by the radar apparatus. The effect of transmission and reflection on the phase of the signal is represented in the drawing by a shift circuit 5, corresponding to the Doppler phase shift $\Delta F$ due to the movement of the target, followed by another variable phase shift circuit 6, corresponding to the phase shift or time delay due to the distance covered. The transmitted and received signals are applied to respective inputs of a mixer 4 which is in fact a multiplier.

The sequence of maximum length which modulated the oscillator 1 is also correlated with this same sequence, delayed by the time $\tau_0$, in a multiplier 7. As the sequence is in binary form, this multiplier 7 can take the form of a modulo-2 adder. The delay $\tau_0$ is that over which correlation is required to take place. The resulting sequence operates a switch 8, for example comprising commutator diodes, in such a way that the 0's of this resulting sequence direct the signals coming from the mixer 4 on to channel I, and the 1's on to channel II.

Each of the channels I and II comprises a respective filter 9, 10, which carries out the integration of the Doppler signals, and at the same time blocks the signals of the beat frequency $F_0 - F_1$. These signals are subsequently rectified by diodes 11 and 12 and then applied to a subtraction circuit 13 which produces a difference signal at 14. The signal obtained at 14 is then used to establish the distance and the situation of the target, by means from within the framework of the invention.

The signals on channel I are shown in FIG. 4, those on channel II in FIG. 5, and the resulting correlation function in FIG. 6. In FIGS. 4 to 6, the amplitude values given are those at the $n$th stage of the shift register 2. It can be seen, when considering FIG. 6, that one of the advantages of the system is that the points where the correlation function cuts the horizontal axis are independent of the voltage U, and therefore of the amplitude of the received signal.

A second advantage of the system of the invention is the considerable simplification of the radar frequency circuits compared to those of a prior art system using a binary phase modulation from 0 to $\pi$.

I claim:

1. A doppler radar device for target measurements comprising the combination of:
   a pseudo-random digital pulse generator delivering a series of pulses alternatively representative of 1 and 0 binary states;
   an oscillator under the control of said pulse generator to alternatively deliver signals at two different frequencies for radar transmission purposes;
   a first multiplier having two inputs to which are applied respectively said series of pulses and a delayed version thereof imparted with a predetermined delay corresponding to the distance zone to be surveyed by radar, and an output;
   a second multiplier having two inputs to which are applied respectively said radar transmission signals and radar receiver echo signals, and an output;
   a switch connected to said second multiplier output and monitored by said first multiplier output;
   a 1 channel and a 0 channel each comprising a filter, under the control of said switch to be alternatively connected therethrough to said second multiplier output, depending on the monitoring of said switch by said first multiplier output; and
   means for extracting from said channels an operational radar signal.

2. A device as claimed in claim 1, wherein said channels branch in parallel from said switch and each further includes a rectifier, and wherein said means for extracting includes a subtractor having two inputs respectively connected to each of said channels.

3. A device as claimed in claim 1, wherein said pseudo-random digital pulse generator includes a self-looped shift register operated by a clock.

* * * * *